Patented Sept. 13, 1932

1,876,957

UNITED STATES PATENT OFFICE

KARL KELLER, OF FRANKFORT-ON-THE-MAIN-FECHENHEIM, AND EDUARD GOFFERJÉ, OF FRANKFORT-ON-THE-MAIN, GERMANY, ASSIGNORS TO GENERAL ANILINE WORKS, INC., OF NEW YORK, N. Y., A CORPORATION OF DELAWARE

PROCESS OF SULPHONATING HIGHER PARAFFIN HYDROCARBONS

No Drawing. Application filed July 9, 1930, Serial No. 466,884, and in Germany August 3, 1929.

In the copending application Serial No. 466,885, filed by Karl Keller and Eduard Gofferjé on the same date a process for manufacturing new conversion products of higher paraffin hydrocarbons is described which comprises treating poly-halogenated derivatives of technical mixtures of solid or liquid higher paraffin hydrocarbons with an alkali of the alkali metals or alkaline earth metals.

According to our present invention the products obtained as above described are transformed into new products of special technical value by sulphonation. The sulphonation may be carried out by using sulphuric acid monohydrate, fuming sulphuric acid or other sulphonating agents with or without the addition of a suitable diluent such as carbon tetrachloride, trichloroethylene, petrol ether or of compounds assisting the sulphonation such as lower fatty acids or their anhydrides or chlorides.

According to the character of the starting material and of the sulphonating agent and in accordance with the conditions applied more or less varied products of a lower or higher degree of sulphonation are obtained all distinguished by the valuable properties due to the introduction of sulphuric acid residues into the molecule.

The new products of sulphonation apparently contain the sulphuric acid residues both as sulphuric acid esters and as true sulphonic acid groups. The proportions of the two classes of sulphuric acid residues depend upon the selection of the reaction components and the methods employed for the reaction and isolation so that the properties of the end products can be adjusted to any desired degree.

The new products are viscous oils easily soluble in water. They may be used in the form of aqueous solutions of the free acids as well as of their alkali salts. They are distinguished by an almost complete resistance to acids and by a very good emulsifying effect. In dilute solution they have a good wetting capacity and an excellent protective effect, they prevent, for example, to a great extent the separation of lime soaps in flakes when using hard water. These new products may be used in the textile and leather industry as such or mixed with other substances.

In order to further illustrate our invention the following examples are given, the parts being by weight and all temperatures in centigrade degrees; but we wish it however to be understood that we are not limited to the particular products nor reaction conditions mentioned therein:—

Example 1

36 parts of the reaction product (obtainable by heating 22 parts of a dichloro derivative of hard paraffin with a solution of 10 parts of sodium hydroxide in a mixture of 75 parts of ethanol and about 70 parts of water for 6 to 7 hours at about 170 to 175° C. in an autoclave, while stirring) are dissolved in 100 parts of carbon tetrachloride. After cooling the solution to about −10° 60 parts of fuming sulphuric acid of 27 per cent are added at −10° to 5° while well stirring. Then the reaction mass is stirred for about 2 hours longer at −5-0° and poured on about 200 parts of ice. The emulsion obtained is mixed with caustic soda solution until a weakly acid reaction is exhibited, whereupon the temperature is maintained below 10° the separated sodium sulphate is filtered off with suction and the filtrate is evaporated in vacuo. By this operation the carbon tetrachloride used is recovered. After having been filtered off from separated salt the solution is freed from some quantities of unsulphonated ingredients by extracting with organic solvents. By salting out the solution with common salt the new sulphonation product is obtained as a yellow colored, viscous oil, which may be used preferably for various purposes in the textile and leather industry. It contains a true sulphonic group and is distinguished by a good emulsifying property. Its aqueous solutions possess even in a very diluted state a good wetting power and an excellent protective power.

Example 2

32.5 parts of the reaction product (obtainable by heating 32 parts of a dichloro derivative of hard paraffin with a solution of 14 parts of caustic potash in 120 parts of ethanol with the addition of 0.4 parts of copper powder in an autoclave at about 140 to 145° C. for about five hours, while stirring) are dissolved in 80 parts of ethylene trichloride. The solution is cooled to about −15° and 85 parts of fuming sulphuric acid of 30 per cent $SO_3$ content are allowed to run in at −15-5° while well stirring. The reaction mass is stirred for about 1 hour longer at about −5° and poured on about 180 parts of ice and then worked up as described in Example 1. The yellowish colored viscous oil thus obtained shows similar excellent properties to the product of the foregoing example and also contains a true sulphonic acid group.

Example 3

37.5 parts of the reaction product (obtainable by heating 35 parts of a trichloro derivative of hard paraffin for about 10 hours with a solution of 10 parts of sodium hydroxide in about 80 parts of water in an autoclave at about 225 to 230° C. while stirring) are dissolved in 100 parts of petroleum ether, the solution is cooled down to about −12° and 25 parts of chloro-sulphonic acid are added while well stirring the temperature being kept below −5°. Then the reaction mass is stirred for about 2 hours longer at about 0° and poured on about 50 parts of ice. The oil is separated from the acid solution and from the petroleum ether, washed with salt water and mixed with caustic soda solution until a weakly acid reaction remains. By distillation of the solution in vacuo the remaining paste of the petroleum ether may be recovered. The new sulphonation product which contains the sulphuric ester group is obtained from the remaining solution as a light yellow colored viscous oil, soluble in water and in ether, by salting out with a common salt solution. The new product is distinguished by various good properties, as for example by a good resistance to acids, a good wetting and excellent protective power and may be used for various purposes.

By sulphonating in a corresponding manner an oil obtainable by decomposing a trichlorinated hard paraffin with an aqueous caustic solution, and still containing besides 1 chlorine atom about one double bond and hydroxyl groups in the molecule, with equimolecular proportions of chloro-sulphonic acid and working up as usual, a light yellow colored viscous oil is obtained which is especially distinguished by a very good softening effect for artificial silk.

Example 4

To 35 parts of the reaction product (obtainable by heating 21.5 parts of a trichloro derivative of hard paraffin for about 5 hours in an autoclave with a solution of 9 parts of caustic potash in 80 parts of methanol at about 140 to 145° C.) at a temperature of 0–10° 30 parts of monohydrate are added while well stirring. The mixture is stirred for about 1 hour longer at 10–15° and then poured on about 150 parts of ice. The separated oil is isolated from the acid solution and neutralized with caustic soda solution at 0–5°. The new sulphonation product is obtained by separation from the salt solution; it contains a sulphuric acid ester group and is a weakly colored viscous oil, which shows the same properties as the products of the foregoing examples.

Example 5

21 parts of the reaction product (obtainable by heating 23 parts of a tetra-chloro derivative of hard paraffin for several hours with a solution of 21 parts of sodium carbonate in about 100 parts of water in an autoclave at about 210 to 220° C. while stirring) are dissolved in 40 parts of petroleum ether. The solution is cooled to about −5° and 55 parts of fuming sulphuric acid of 27 per cent $SO_3$ content are added while stirring the mass for about 6 hours at 0°. Then the sulphonation mass is poured on about 200 parts of ice and the emulsion obtained is neutralized with sodium carbonate. The petroleum ether is separated and the solution of the sulphonation product is evaporated in vacuo to the desired concentration. The sodium sulphate separated is filtered and a new sulphonation product is isolated which contains a true sulphonic acid group, forming a yellow colored viscous oil, corresponding in its properties to the products of the foregoing examples, especially distinguished by an excellent protective power.

By sulphonation with 17 parts of fuming sulfuric acid of 27 per cent $SO_3$ content instead of 55 parts and working up as described above, a light yellow colored viscous oil which is distinguished by an excellent softening effect for artificial silk is obtained.

Example 6

42 parts of the reaction product (obtainable by heating 53 parts of a hexa-chloro derivative of hard paraffin for a fairly long time in an apparatus provided with a reflux condenser with a solution of 39 parts of caustic potash in 200 parts of ethyl alcohol) are dissolved in 90 parts of benzine. The solution is cooled to about −5° C. and 100 parts of fuming sulphuric acid of 30 per cent $SO_3$ content are allowed to run in at −5–0° while well stirring. The mixture is stirred for about 7 hours longer at 0° whereby the sulphonation product gradually separates as a brownish colored oil. The sulphonation mass is worked up as described in the foregoing example. A brownish solution of the sulphonation product is obtained containing a true sulphonic acid group, of the same varied properties as the products of the foregoing examples.

*Example 7*

48 parts of the reaction product (obtainable by heating 57 parts of a hepto-chloro derivative of hard paraffin for several hours at 190 to 200° C. with a solution of 48 parts of potassium carbonate in about 200 parts of water in an autoclave while stirring) are dissolved in 50 parts of acetic acid anhydride. The solution is cooled to $-5°$ and 50 parts of sulphuric acid of 66° Bé. are added at about $-5-0°$ while stirring. Then the temperature is increased during 2 hours to 30°, the reaction mass is poured on about 200 parts of ice and the emulsion obtained is neutralized with caustic soda solution. The mixture is allowed to stand for some time and the separated oil is isolated from the salt solution. The new sulphonation product, which contains one true sulphonic acid group, is likewise easily soluble in water and may be used for similar varied purposes to the products of the foregoing examples.

We claim :—

1. A process for manufacturing new conversion products of higher paraffin hydrocarbons, which comprises treating with a sulphonating agent the product obtainable by reacting with an alkali of the alkali metals or alkaline earth metals on a poly-halogenated derivative of technical mixtures of higher paraffin hydrocarbons.

2. A process for manufacturing new conversion products of higher paraffin hydrocarbons, which comprises treating with a sulphonating agent the product obtainable by reacting with an alkali of the alkali metals or alkaline earth metals on a poly-halogenated derivative of technical mixtures of higher solid paraffin hydrocarbons.

3. A process for manufacturing new conversion products of higher paraffin hydrocarbons, which comprises treating with a sulphonating agent the product obtainable by reacting with an alkali of the alkali metals or alkaline earth metals on a poly-halogenated derivative of hard paraffin.

In testimony whereof, we affix our signatures.

KARL KELLER.
EDUARD GOFFERJÉ.